US005573682A

United States Patent [19]

Beason, Jr. et al.

[11] Patent Number: 5,573,682

[45] Date of Patent: Nov. 12, 1996

[54] PLASMA SPRAY NOZZLE WITH LOW OVERSPRAY AND COLLIMATED FLOW

[75] Inventors: George P. Beason, Jr., Arab; Timothy N. McKechnie, Huntsville; Christopher A. Power, Guntersville, all of Ala.

[73] Assignee: Plasma Processes, Huntsville, Ala.

[21] Appl. No.: 426,621

[22] Filed: Apr. 20, 1995

[51] Int. Cl.[6] .................... B23K 10/00

[52] U.S. Cl. .................... 219/121.5; 219/121.51; 219/121.47; 219/76.16; 427/446

[58] Field of Search .................... 219/121.47, 121.5, 219/121.51, 75, 76.16, 76.15, 121.59, 121.48; 427/446, 449

[56] References Cited

U.S. PATENT DOCUMENTS

| | | | |
|---|---|---|---|
| 3,055,591 | 9/1962 | Shepard . | |
| 3,075,065 | 1/1963 | Ducati et al. | 219/121.52 |
| 3,447,322 | 6/1969 | Mastrup | 219/121.52 |
| 3,914,573 | 10/1975 | Muehlberger | 219/76 |
| 3,935,418 | 1/1976 | Stand et al. | 219/121 |
| 4,670,290 | 6/1987 | Itoh et al. | 427/34 |
| 4,916,273 | 4/1990 | Browning | 219/121.47 |
| 5,014,915 | 5/1991 | Simm et al. | 239/79 |
| 5,043,548 | 8/1991 | Whitney et al. | 219/121 |
| 5,047,612 | 9/1991 | Savkar et al. | 219/121 |
| 5,225,652 | 7/1993 | Landes | 219/121 |
| 5,243,169 | 9/1993 | Tateno et al. | 219/121 |

FOREIGN PATENT DOCUMENTS

| | | |
|---|---|---|
| 0425623B1 | 3/1994 | European Pat. Off. . |
| 4129120A1 | 3/1993 | Germany . |
| 3538390A1 | 10/1985 | Netherlands . |

*Primary Examiner*—Mark H. Paschall
*Attorney, Agent, or Firm*—Hopkins & Thomas

[57] ABSTRACT

An improved nozzle for reducing overspray in high temperature supersonic plasma spray devices comprises a body defining an internal passageway having an upstream end and a downstream end through which a selected plasma gas is directed. The nozzle passageway has a generally converging/diverging Laval shape with its upstream end converging to a throat section and its downstream end diverging from the throat section. The upstream end of the passageway is configured to accommodate a high current cathode for producing an electrical arc in the passageway to heat and ionize the gas flow to plasma form as it moves along the passageway. The downstream end of the nozzle is uniquely configured through the methodology of this invention to have a contoured bell-shape that diverges from the throat to the exit of the nozzle. Coating material in powder form is injected into the plasma flow in the region of the bell-shaped downstream end of the nozzle and the powder particles become entrained in the flow. The unique bell shape of the nozzle downstream end produces a plasma spray that is ideally expanded at the nozzle exit and thus virtually free of shock phenomena, and that is highly collimated so as to exhibit significantly reduced fanning and diffusion between the nozzle and the target. The overall result is a significant reduction in the amount of material escaping from the plasma stream in the form of overspray and a corresponding improvement in the cost of the coating operation and in the quality and integrity of the coating itself.

10 Claims, 2 Drawing Sheets

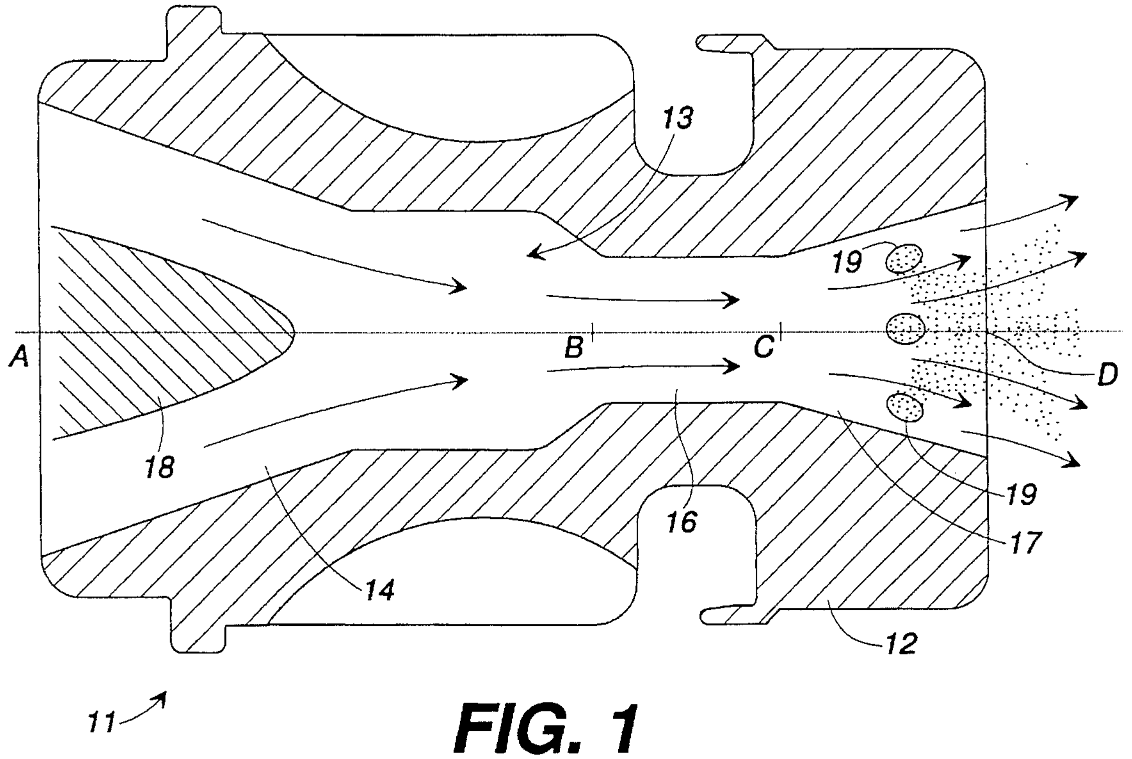
FIG. 1
(PRIOR ART)
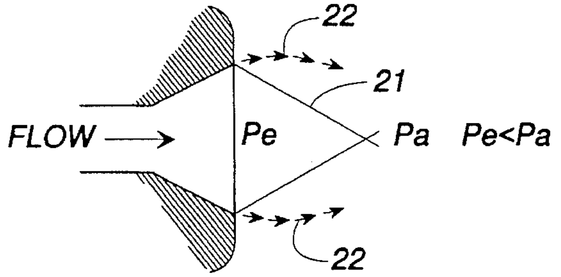
FIG. 2A
(PRIOR ART)
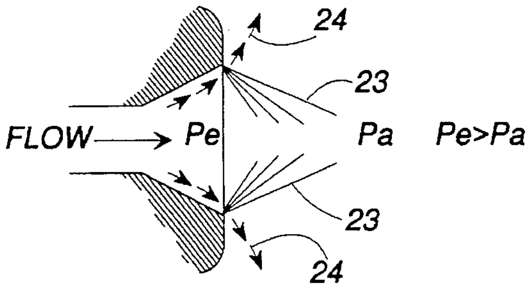
FIG. 2B
(PRIOR ART)
FIG. 2C
(PRIOR ART)
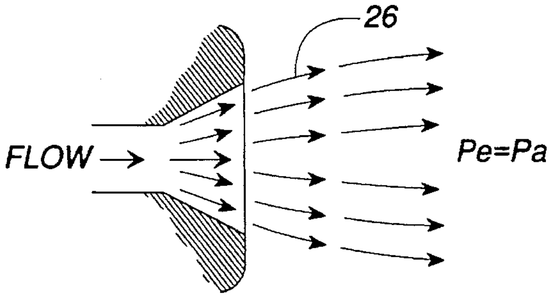

PLASMA SPRAY NOZZLE WITH LOW OVERSPRAY AND COLLIMATED FLOW

STATEMENT OF GOVERNMENT SUPPORT

This invention was made with Government support under Contract NAS8-39802 awarded by NASA. The Government has certain rights in this invention.

TECHNICAL FIELD

This invention relates generally to the plasma spray deposition of coatings onto a substrate and more specifically to nozzles used in plasma spray guns for directing the plasma spray toward the target substrate.

BACKGROUND OF THE INVENTION

The plasma spraying of metallic, ceramic, and other coatings onto a substrate material has long been used to create critical mechanical parts having a coating of a hard wear or heat resistant material overlaid onto a strong ductile material. The resulting composite provides a structural component that has good mechanical properties such as strength and ductility and also has a surface that is resistant to corrosion and/or heat stress caused by rapid changes in temperature. Rocket engine turbine blades, for example, are traditionally plasma spray coated with an appropriate ceramic that can withstand the rapid temperature changes that occur when the engine is started and shutdown. In other applications, plasma spray techniques have been used to replace material that may have worn away from a component part. Plasma spray techniques have also been used to build up a thick coating of material over a preformed mold, thus actually fabricating a component from the sprayed material itself. Other advantageous applications of plasma sprays have also been made.

The plasma spraying of coatings generally is achieved by means of a plasma spray device such as a gun. While such devices can vary greatly in their operational details, their fundamental elements usually include a passageway through which an inert gas or air is expanded, often to supersonic velocities. A cathode usually is provided at the upstream end of the passageway. A high current arc is electrically induced between the cathode and the walls of the passageway, which serve as an anode. The arc functions to heat the gas flow as it moves along the passageway to temperatures sufficient to ionize a portion of the gas stream and form a plasma. The heated plasma flow then moves toward the downstream end of the passageway. It is usually in this section that the material to be deposited, in powder form, is injected into the plasma flow. The material then becomes entrained in the flow and begins at least partially to melt. As the flow leaves the device through the nozzle, it is directed onto the target surface to be coated. When the plasma impacts the surface, the particles of partially or fully melted coating material bond to the surface and to each other creating the high quality bonded coating characteristic of plasma spray techniques.

Most modern plasma spray devices incorporate a convergent–divergent Laval nozzle design wherein the upstream end of the nozzle converges to a throat section from which the downstream end of the nozzle extends. The downstream end of the nozzle usually diverges from the throat. In fact, divergence of at least a portion of the downstream end is required by the laws of fluid dynamics if it is desired to achieve a supersonic plasma flow at the nozzle exit. The coating material, usually in fine powder form, typically is injected into the flow in the region of the divergent portion of the nozzle. This material enters and becomes entrained in the plasma flow and at the same time is heated by the flow so that when the flow impacts a substrate to be coated, the material bonds to its surface.

Examples of plasma spray devices such as that just described are found in the disclosures of numerous patents including U.S. Pat. Nos. 4,670,290 of Itoh et al., 5,225,6562 of Landes, 5,243,169 of Tateno et al., 5,014,915 of Simm et. al., 5,043,548 of Whitney, et al., 3,914,573 of Muehlberger, and 3,055,591 of A. P. Shepard. Most of these devices incorporate a convergent–divergent nozzle design to achieve supersonic flow, but some have cylindrical nozzles for producing subsonic flows. The typical divergent section of a plasma spray nozzle has a cone-shaped contour with straight divergent walls.

A common and serious problem inherent with plasma spray nozzles in both vacuum and air plasma spray processes is that they tend to produce overspray during the deposition process. Overspray comprises undeposited free floating powder that escapes from the plasma flow prior to deposition onto the target substrate. Overspray increases the cost of the process through wasted material and jeopardizes the integrity and quality of the coating by randomly entraining itself into the coating. The major cause of generated overspray is poor nozzle designs in commercially available plasma guns. Current supersonic nozzles have downstream ends with a conical shape and are not designed to produce ideal flow expansion at the nozzle exit. Ideal flow expansion occurs when the pressure of the exiting plasma is the same as the ambient pressure in the region of the nozzle.

The poor design of current plasma nozzles results in overspray through a variety of phenomena. For example, if the plasma flow is overexpanded at the nozzle exit; that is, if the plasma pressure is less than the ambient pressure, then a shock wave is produced at the nozzle exit, followed by an alternating series of expansion fans and shocks. Interaction between the shock waves and the flow changes the momentum, shape, and direction of the flow causing many particles (injected into the flow) to escape and become overspray. Similarly, if the plasma flow is underexpanded; i.e. the plasma pressure at the nozzle exit is greater than the ambient pressure, then expansion fans are produced at the nozzle exit, followed by an alternating series of shock waves and expansion fans. As with shock waves, interaction between expansion fans and the flow changes the momentum of and results in structure within the flow, again allowing particles to escape the flow in the form of overspray.

Conical nozzles can be designed such that the flow is ideally expanded at the nozzle exit, thus, eliminating shock and expansion phenomena. However, since the nozzle is conical, the flow at the exit plane of the nozzle embodies dynamic components that are not parallel to the axis of the nozzle. These dynamic flow components diverge and induce divergent particle trajectories as the flow traverses the space between the nozzle and the target resulting in overspray and lower particle impact velocities.

As a result of all of these phenomena, currently available plasma spray nozzles, even when designed to produce an ideally expanded flow, tend to deposit on a target substrate less than ninety percent (90%) of the coating material injected into the flow. The other ten percent (10%) or more becomes overspray. Clearly, even relatively small improvements in the efficiency of plasma spray nozzles could be critically important in reducing the expense and undesirable effects of overspray. For example, an increase in efficiency from ninety percent to ninety five percent would reduce the total volume of overspray by half. Such efficiencies, have heretofore been unattainable with conventional plasma spray nozzles.

Thus, there exists an urgent and heretofore unaddressed need for an improved plasma spray nozzle that significantly lowers the amount of overspray produced by prior art nozzles by producing a plasma flow that is both ideally expanded at the nozzle exit to eliminate shock and expansion wave phenomena and that is highly collimated to reduce the diffusing effects of divergent, dynamic components in the flow. It is to the provision of such a plasma spray nozzle that the present invention is primarily directed.

SUMMARY OF THE INVENTION

The present invention, in one preferred embodiment thereof, comprises an improved plasma spray nozzle that exhibits significantly lower overspray than prior art nozzles. This results in greater economy and in highly improved quality of coatings applied with the nozzle. The nozzle of this invention is a Laval type nozzle having a converging upstream section, a throat, and a diverging generally bell shaped downstream section. With this configuration, the nozzle produces a plasma flow that is supersonic at the nozzle exit. The bell shape of the diverging downstream section of the nozzle is determined through the methods of this invention to produce a plasma flow at the nozzle exit that is ideally expanded, i.e. that has a pressure equal to a predetermined ambient pressure in which spraying is to be accomplished. In this way, flow phenomena such as shock waves and expansion fans that cause overspray are virtually eliminated, thus reducing overspray significantly.

In conjunction with the production of an ideally expanded flow, applicant's bell-shaped nozzle design also produces a highly collimated plasma flow at the nozzle exit. That is, dynamic components in the flow that are not parallel to the nozzle axis are significantly reduced or eliminated. As a result, the plasma flow remains tight and coherent from the nozzle exit to the target substrate, and overspray caused by divergence and diffusion of the flow is significantly reduced.

It has been found that the unique bell shaped nozzle of this invention, which combines ideal flow expansion with a collimated flow, can increase the coating material deposition efficiency by at least 5 percentage points for a 90% efficient process, thus reducing overspray by fifty percent or more. This results in a significant decrease in the cost of the plasma spray process and a significant increase in the quality of the finished coating. Further savings are realized from the fact that, since more coating material is deposited in a given time with applicant's nozzle, the time required to coat a part is reduced. This can become a significant savings since many plasma spray jobs can span several hours.

The unique bell shape of the downstream end of the nozzle of this invention, which simultaneously achieves ideal expansion and collimated flow, is determined through application of techniques used in the design of supersonic rocket engine nozzles. A two-dimensional Method of Characteristics scheme, assuming isentropic flow is applied to the flow through the nozzle with the desired exit conditions of the flow imposed on the model. This method is described more fully in the detailed description portion of this application. The result of the application of this method is a unique bell shaped contour for the diverging downstream end of the nozzle that results at the nozzle exit in the ideal expansion and collimated flow responsible for the dramatic deposition efficiency increases inherent in applicant's nozzle.

Thus, the present invention embodies a unique plasma spray nozzle that surpasses the shortcomings of the prior art by producing a plasma spray that is virtually free of shock phenomena and that remains highly collimated from the nozzle exit to the target to be coated. The nozzle has been found to increase coating deposition efficiencies significantly and to reduce unwanted overspray by fifty percent or more. These and other features and advantages of the present invention will become more apparent upon review of the detailed description set forth below taken in conjunction with the accompanying drawing figures.

BRIEF DESCRIPTION OF THE DRAWINGS

FIG. 1 is a cross-sectional illustration of a common prior art plasma spray nozzle incorporating a conical downstream end.

FIGS. 2*a* through 2*c* illustrate in functional diagrammatic form the conditions that cause overspray in prior art plasma spray nozzles.

DETAILED DESCRIPTION OF THE PREFERRED EMBODIMENT

Figure 3:
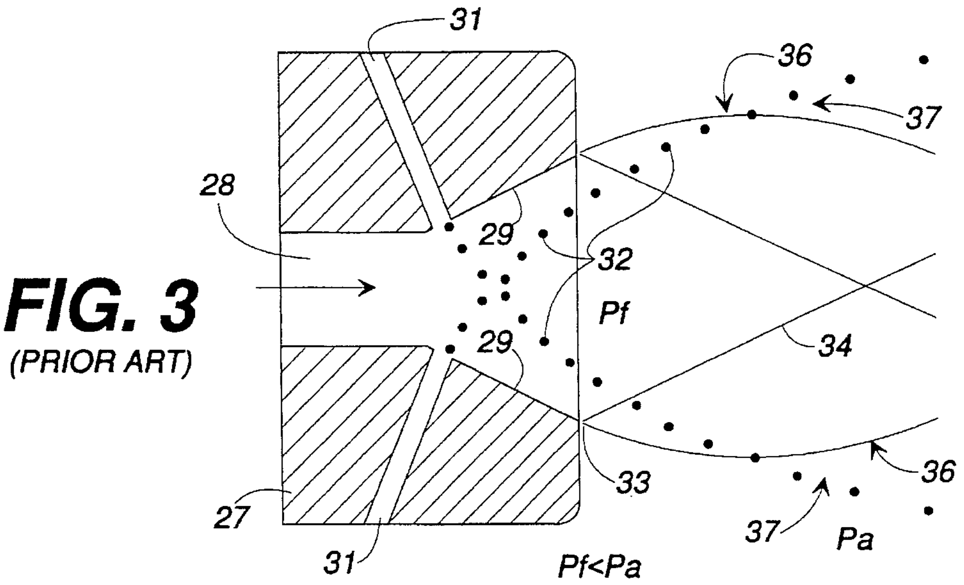
FIG. 3 (PRIOR ART)
FIG. 3 is a cross-sectional view of the downstream end of a common plasma spray nozzle showing injection of powder particles into an overexpanded flow and the escape of the particles from the flow in the form of overspray.

Referring now in more detail to the drawings, in which like numerals refer to like parts throughout the several views, FIG. 1 illustrates in cross-sectional form a common prior art Laval nozzle for use in supersonic plasma spray coating devices. The nozzle 11 comprises a body 12 that is formed of a durable heat resistant metal. The nozzle 11 is designed to be installed in a plasma spray gun or device such as those illustrated in the prior art patents discussed above.

The body 12 of the nozzle 11 defines an internal passageway 13 that extends longitudinally of the body. The passageway 13 has an upstream section 14 that extends from position A to position B along the center line in FIG. 1, a throat 16 that extends from position B to position C along the center line, and a downstream section 17 that extends from position C to position D along the center line. The upstream section 14 of the passageway converges to the throat 16 and the downstream section 17 diverges away from the throat 16. This general converging–diverging passageway shape is a physical requirement for generating supersonic flow at the nozzle exit and is commonly used in plasma spray nozzles to create such flows.

In a typical plasma spray gun, the upstream end 14 of the passageway is shaped to accommodate a cathode 18. In use, the cathode 18 and the nozzle body 12 are electrically charged with opposite polarities to create a high current electrical arc between the cathode 18 and the body 12. This arc functions to heat the flow of air or other gases as it moves through the upstream section of the nozzle passageway to create a high temperature ionized plasma within the passageway. Other methods of heating the flow to plasma temperatures can also be employed such as, for example, focusing a high energy laser beam into the flow. The arc heating method is illustrated in FIG. 1 because it is commonly used in commercially available plasma spray devices.

The downstream section 17 of the passageway flares or diverges outwardly from the throat with a substantially conical cross section. It is within this expanding downstream section that the flow through the passageway reaches supersonic speeds. A set of injection ports 19 are formed through the body 12 in the region of the downstream section 17 or throat 16. The coating material, in powder form, typically is injected into the plasma flow through the injection ports 19 as illustrated in FIG. 1. The particles of the powder then become entrained in the flow and are blown from the exit end of the nozzle toward the target to be coated.

In operation, a gas, which may be an inert gas, an elemental gas such as nitrogen, or simply air, is forced into and through the passageway 13 of the nozzle 11. The movement of gas through the passageway is indicated by the arrows in FIG. 1. As the gas passes the cathode within the upstream end of the passageway, it is heated by the electric arc induced in the passageway to temperatures sufficiently high to create a plasma. The heating of the gas also serves to expand the gas and thus increase its velocity through the passageway. As the heated plasma moves into the throat 16 of the passageway, its velocity reaches the speed of sound, Mach 1. As the plasma flow moves past the throat and into the divergent downstream section 17 of the nozzle, its velocity increases to supersonic speeds while the pressure of the plasma decreases.

As the plasma passes the injection ports 19, the coating material in powder form is injected into the plasma flow and the particles become entrained in the flow. The plasma with its entrained powder particles is then ejected from the exit end of the nozzle and is directed to a target to be coated. Because of the high temperatures present in the plasma, the particles become molten or partially molten as they traverse the distance between the nozzle and the target. Upon impact, the particles bond to the surface of the target and to each other to create a coating of the sprayed material on the surface of the target.

As mentioned above, prior art plasma spray nozzles of this type, while functioning satisfactorily for many purposes, nevertheless exhibit certain inherent shortcomings that limit their efficiency and performance. FIGS. 2*a*–2*c* illustrate the most common such shortcomings. First, commercially available supersonic plasma spray nozzles are formed with conically expanding downstream sections. These nozzles generally are not designed to create an ideally expanded plasma flow at the exit of the nozzle. That is, they are not designed such that the pressure within the plasma flow at the nozzle exit is equal to the ambient pressure within which spraying is being accomplished. The pressure of the plasma flow is either lower than the ambient pressure, resulting from an overexpanded flow, or higher than the ambient pressure, resulting from an underexpanded flow. The consequences of an overexpanded flow and an underexpanded flow are illustrated in FIGS. 2*a* and 2*b* respectively.

In the overexpanded flow of FIG. 2*a*, the pressure within the plasma flow at the nozzle exit is less than the ambient pressure. Because of the supersonic nature of the flow, this condition results in shock waves 21 that originate at the nozzle exit and alternatively occur with expansion waves down the length of the flow. In addition, because of the pressure difference, the flow envelope tends to curve inwardly on itself as indicated at 22. The result is a plasma spray with alternating bulges that extend along the length of the spray. The spray thus becomes structured and uncollimated as it moves from the nozzle to the target.

Since the masses of the powder particles injected into the flow are much greater than the masses of the gas constituents, the uncollimated flow tends to turn away from the powder particles near the envelope of the flow allowing the powder particles to escape the flow as overspray. The momentum of the particles is not significantly changed through any interaction with the shock waves, thus their trajectories are unaltered, resulting in the expulsion of some particles from the confines of the flow.

Similarly, when the plasma flow is underexpanded as shown in FIG. 2*b*, that is, when the pressure within the plasma at the nozzle exit is greater than the ambient pressure, phenomena known as expansion fans 23 are created within the plasma flow at the nozzle exit. The higher pressure within the plasma flow initially tends to divert the flow outward from the nozzle as indicated at 24 in FIG. 2*b*. Also, because shock waves and expansion waves reflect from a free jet boundary as the opposite phenomenon, an alternating series of expansion waves and shock waves is produced in the plane to maintain pressure continuity across the plane boundary. Thus, the flow is again turned away from the particles within the flow resulting in overspray. As with an overexpanded flow, interaction between the flow phenomena 21 and 23 and the plasma flow changes the momentum of the flow diverting it away from the particles. Therefore, both overexpanded and underexpanded plasma flows result in significant overspray.

Overspray is also generated in commercially available supersonic plasma spray nozzles even when the flow is ideally expanded at the nozzle exit. This situation is illustrated in FIG. 2*c*. Here, shock waves and expansion fans are less prevalent and more of the flow is directed parallel to the nozzle axis and perpendicular to the target. However, since the downstream end of the nozzle is conical, the flow exiting the nozzle has dynamic components that are not parallel to the nozzle axis. As the plasma moves further from the nozzle, the flow turns parallel to the nozzle axis to maintain the pressure continuity across the free-jet boundary which, again, results in overspray.

Thus, overspray is a significant problem in plasma spray devices whether caused by overexpanded flows, underexpanded flows, or simply by the divergent dynamic components in the flow emerging from a conical nozzle. It has been found that, even under the best conditions, commercially available plasma spray nozzles deposit onto the target substrate only about 90% or less of the material initially injected into the flow. The other 10% or more of material escapes the flow in the form of overspray.

FIG. 3 illustrates in greater detail the effects of an overexpanded plasma flow on particles entrained within the flow. In this figure, the nozzle body 27 defines a passageway having a throat 28 from which a conically shaped downstream end of the passageway 29 extends. Injection ports 31 are provided for injecting the coating material into the plasma flow so that the particles 32 become entrained in the flow.

As the plasma flow (now supersonic) reaches the exit plane 33 of the nozzle, the pressure within the flow $P_f$ is less than the ambient pressure $P_a$. As a consequence, shock waves 34 eminate from the exit plane interface and extend down the length of the flow. The shock waves, due to the difference in pressure between the flow and the atmosphere, turn the flow envelope inwardly creating a bulge in the flow indicated at 36 in FIG. 3. The bulges repeat along the length of the flow due to the presence of alternating shock waves and expansion fans.

The particles 32 within the plasma flow, having masses greater than that of the plasma gas, are not turned inwardly by the shock waves. Instead, they are free to move beyond the envelope of the plasma as indicated at 37 in FIG. 3 and escape the flow completely in the form of overspray. Currently available plasma spray nozzles, even when fine tuned, exhibit this problem to some degree and have reached an inherent limit of about 90% in deposition efficiency.

Figure 4:
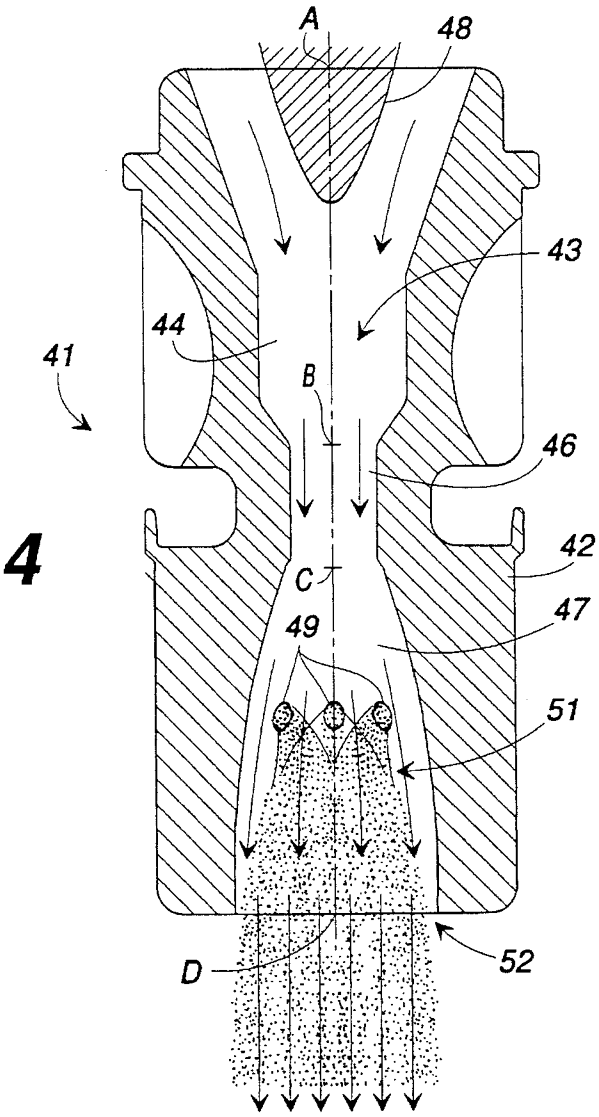
FIG. 4 is a cross-sectional illustration of a plasma spray nozzle that incorporates principles of the present invention in a preferred form.

FIG. 4 illustrates a supersonic plasma spray nozzle that embodies principles of the present invention in a preferred form. The nozzle 41 comprises a nozzle body 42 formed of a rigid heat resistant metal. A passageway 43 extends through the body 42. The passageway has an upstream section 44, which extends from point A to point B along the center line of the passageway, a throat section 46, which extends from point B to point C along the center line of the passageway, and a downstream section 47, which extends from point C to point D along the center line of the passageway.

As with previously described prior art embodiments, the upstream end 44 of the passageway is configured to accommodate an electrical cathode 48, which, in use, is charged to create a high current electrical arc between the cathode 48 and the wall of the passageway 43. The arc functions to heat and ionize gases flowing through the passageway so that the gases take on the characteristics of a high temperature plasma.

The downstream section 47 of the nozzle passageway is provided with injection ports 49, through which the material to be sprayed, in powder form, is injected into a plasma flow traversing the passageway. The injection of these powder particles is indicated generally at 51 in FIG. 4. As the powder particles are injected from the injection ports, they become entrained in the plasma flow moving through the nozzle and are ejected with the flow from the exit end 52 of the nozzle.

The downstream end 47 of the passageway 43 is seen to be formed with a generally diverging but bell-contoured shape. The shape of the bell contour is uniquely determined by the methods of this invention to ensure simultaneously that the flow exiting the nozzle is ideally expanded, thus eliminating shock waves and expansion fans, and is highly collimated and moving parallel to the axis of the nozzle, thus reducing spreading and diffusion of the plasma flow spray as it moves away.

To illustrate the techniques used to design the unique bell shape contour of the nozzle, it will be assumed in the following discussion that the nozzle will be used with an Ar—$H_2$ plasma gas and that frozen flow conditions prevail throughout the entire flow field in the divergent section of the nozzle. For simplification (disregarding high temperature effects), the flow in the divergent portion of the nozzle can also be assumed to be isentropic since the nonlinear effects of the plasma arc do not extend that far downstream and the anode cooling passages do not extend past the throat. With these assumptions, the isentropic flow equations can be applied as illustrated below to determine the design exit Mach number and exit pressure for a designated expansion ratio, $A_D$ (equal to the exit area divided by the throat area), and ratio of specific heats for the plasma gas, γ.

Using the standard approach for calculating properties of mixtures in equilibrium, the Ar—$H_2$ plasma's average ratio of specific heats, γ, can be determined to be 1.65. This assumes that the flow temperature is 12,000° K. at the throat and drops to approximately 3,000° K. at the nozzle exit. Also, under nominal operating conditions, the stagnation pressure, $P_0$, at the nozzle exit plane can be estimated to lie between 9 pounds per square inch and 12 pounds per square inch.

With this information, the design exit Mach number for a nozzle with a particular expansion ratio can be calculated by solving the isentropic flow equation relating the expansion ratio to the exit Mach number and to γ. This equation is presented in the form $$\left(\frac{A_e}{A_t}\right)^2 = \frac{1}{M_e^2}\left[\frac{2}{\gamma+1}\left(1+\frac{\gamma-1}{2}M_e^2\right)\right]^{\frac{\gamma+1}{\gamma-1}}$$

where $A_e$ is the nozzle exit area, $A_t$ is the throat area, and $M_e$ is the design exit Mach number. For a predetermined expansion ratio ($A_e/A_t$), this equation can be solved for the design exit Mach number, $M_e$. Once $M_e$ is determined for the given expansion ratio, the static exit pressure within the flow can be determined using the isentropic equation $$\left(\frac{p_o}{p}\right)_e = \left(1+\frac{\gamma-1}{2}M_e^2\right)^{\frac{\gamma}{\gamma-1}}$$

where $p_0$ is the stagnation pressure at the nozzle exit plane and p is the static pressure at the exit plane. This equation, in turn, can be expressed in the form $$p_e = \frac{p_o}{\left(1+\frac{\gamma-1}{2}M_e^2\right)^{\frac{\gamma}{\gamma-1}}}$$

by which the static pressure at the nozzle exit plane can be solved directly for the given physical constraints.

By solving the foregoing equations with the imposed constraint that the static exit pressure be equal to the ambient pressure in which spraying is to be accomplished, the expansion ratio of the divergent section of the nozzle, i.e., the exit area over the throat area, can be uniquely determined. Thus, the size of the nozzle exit aperture relative to the size of the nozzle throat is determined to ensure that the plasma will be ideally expanded at the nozzle exit; that is, that the pressure within the flow will equal the ambient pressure. This, in turn, ensures the elimination of shock phenomena and flow structure that can lead to overspray.

With the expansion ratio and exit Mach number determined, it is desired to design the proper bell-contour shape of the interior walls of the nozzle to ensure isentropic flow expansion within the divergent section of the nozzle and thus a collimated spray issuing from the nozzle. For this design, a two dimensional Method of Characteristics scheme, sometimes used in the design of rocket engines, is applied to compute the proper nozzle contour such that a given flow, with a given γ, is accelerated isentropically to the prescribed Mach number and ideally expanded at the nozzle exit plane. Although, strictly speaking, the flow through the nozzle is three dimensional, the two dimensional method provides reasonable results and is significantly simpler to implement.

A specific example of the implementation of the methods of this invention to design a bell contoured plasma spray nozzle follows. In this example, an Ar—$H_2$ plasma is assumed with a ratio of specific heats, γ, of 1.65. With these assumptions, the technique illustrated on the following pages determines the pressure of the plasma flow at the nozzle exit. If a desired exit pressure is sought, the equation relating $P_e$ to $M_e$ can be solved for $M_e$ and then the equation relating $A_e/A_t$ to $M_e$ can be solved. The expansion ratio that results from the desired exit pressure will then be the ratio of the nozzle exit area to the nozzle throat area. This ratio determines the degree of divergence that must be accomplished along the length of the bell contoured nozzle to achieve an ideally expanded flow at the nozzle exit.

With the expansion ratio of the nozzle determined, it is next incumbent to design a unique bell contoured shape of the nozzle walls that will assure isentropic expansion of the flow from the throat to the exit plane of the nozzle. This is done through application of a two dimensional Method of Characteristics technique. An example of the application of this method for the selected and preimposed physical conditions of the present example is presented on the following pages.

The result of the application of this method is the following contour chart where length is measured along the center axis of the anode, starting at the exit plane and moving back toward the throat.

$A_D=1.44$ $D_t=0.375$ inches

| LENGTH (inches) | DIAMETER (inches) |
|---|---|
| 0 | 0.449738 |
| 0.035 | 0.449419 |
| 0.07 | 0.447882 |
| 0.105 | 0.44418 |
| 0.14 | 0.438978 |
| 0.175 | 0.432591 |
| 0.21 | 0.425309 |
| 0.245 | 0.417388 |
| 0.28 | 0.40906 |
| 0.315 | 0.400526 |
| 0.35 | 0.391959 |
| 0.385 | 0.383501 |
| 0.419 | 0.375 |

Through the preceding example, it can be seen that a bell contour shape defined by the length versus diameter chart above ensures, for the given physical constraints, that the flow through the nozzle will be supersonic and ideally expanded at the nozzle exit. Thus, the flow will not exhibit bulges, shock waves, or expansion fans that can result in overspray. In addition, the uniquely determined bell-shape contour of the nozzle ensures that the plasma flow expands isentropically from the throat of the nozzle to the nozzle exit. This, in turn, assures that the plasma spray exits the nozzle in a highly collimated condition with a minimum of divergent dynamic components in the flow. The ultimate result is a plasma spray that is well defined and remains highly collimated along its length from the nozzle exit to the target to be coated. There are no shockwave induced phenomena within the flow and no structural components in the flow envelope caused by improper expansion of the flow through the nozzle. As a result, the powder particles entrained within the flow tend to stay in the flow and become deposited on the target rather than exiting the flow in the form of overspray. It has been found that application of the methods of this invention to design a bell contoured nozzle results in deposition efficiencies of at least 95%, 5 full percentage points above the best prior art nozzles. This translates to a 50% reduction in the amount of overspray and, in turn, to a significant increase in the efficiency of the spraying process and the quality of the resulting coating.

The invention has been described herein in terms of preferred embodiments and methodologies. It will be obvious to those of skill in this art, however, that various additions, deletions, and modifications might well be made to the illustrated embodiments without departing from the spirit and scope of the invention as set forth in the claims.

BELL NOZZLE SHAPES (gamma=1.65)

Base Units: ft≡1L lb≡1M sec≡1T $$\text{Derived Units: torr} \equiv 1.9336774 \cdot 10^{-2} \cdot \frac{\text{lb}}{\left(\frac{\text{ft}^2}{144}\right)}$$

$$\text{in} \equiv \frac{\text{ft}}{12} \quad \text{psi} \equiv \frac{\text{lb}}{\text{in}^2} \quad \text{insq} \equiv \frac{\text{ft}^2}{144}$$

For gamma=1.65 and using the equations for isentropic flow: $\gamma:=1.65$

For a design expansion ratio of 2, $D_t:=0.375\cdot\text{in}$ $$A_t := \pi \cdot \frac{D_t^2}{4} \qquad A_t = 0.1104 \cdot \text{insq}$$

$A_D:=2$ $A_e:=A_D \cdot A_T$ $A_e=0.2209\cdot\text{insq}$

As a first guess for the root finding scheme, M:=2

$$A_R := \sqrt{\frac{1}{M^2}\cdot\left[\frac{2}{\gamma+1}\cdot\left[1+\left(\frac{\gamma\ 1}{2}\right)\cdot M^2\right]\right]^{\frac{\gamma+1}{\gamma-1}}}$$

Mach :=

$$\text{root}\left[\sqrt{\frac{1}{M^2}\cdot\left[\frac{2}{\gamma+1}\cdot\left[1+\left(\frac{\gamma-1}{2}\right)\cdot M^2\right]\right]^{\frac{\gamma+1}{\gamma-1}}} - A_D, M\right]$$

Mach = 2.3876

For a stagnation pressure at the exit plane of $P_o:=9$ psi The pressure at the exit plane is given by, $$P_e := \frac{P_o}{\left[1+\left(\frac{\gamma-1}{2}\right)\cdot \text{Mach}^2\right]^{\frac{\gamma}{\gamma-1}}}$$

$P_e=32.5222\cdot\text{torr}$

METHOD OF CHARACTERISTICS (2-D)
BELL-AD 1.44
Design exit Mach number = 1.643

$$\gamma = 1.65;\ \theta_{W_{MAX,ML}} = \frac{\nu_M}{2} = \frac{13.816}{2} = 6.908°$$

| Point # | $K_- = \theta + \nu$ | $K_+ = \theta - \nu$ | $\theta = ½(K_- + K_+)$ | $\nu = ½(K_- - K_+)$ | M | μ |
|---|---|---|---|---|---|---|
| 1 | 1.816 | 0 | .908 | .908 | 1.083 | 67.415 |
| 2 | 3.816 | 0 | 1.908 | 1.908 | 1.141 | 61.186 |
| 3 | 5.816 | 0 | 2.908 | 2.908 | 1.187 | 57.397 |
| 4 | 7.816 | 0 | 3.908 | 3.908 | 1.231 | 54.3 |
| 5 | 9.816 | 0 | 4.908 | 4.908 | 1.277 | 51.52 |
| 6 | 11.816 | 0 | 5.908 | 5.908 | 1.32 | 49.262 |
| 7 | 13.816 | 0 | 6.908 | 6.908 | 1.361 | 47.273 |
| 8 | 13.816 | 0 | 6.908 | 6.908 | 1.361 | 47.273 |
| 9 | 3.816 | −3.816 | 0 | 3.816 | 1.227 | 54.559 |
| 10 | 5.816 | −3.816 | 1 | 4.816 | 1.273 | 51.745 |
| 11 | 7.816 | −3.816 | 2 | 5.816 | 1.316 | 49.458 |
| 12 | 9.816 | −3.816 | 3 | 6.816 | 1.358 | 47.446 |
| 13 | 11.816 | −3.816 | 4 | 7.816 | 1.399 | 45.645 |
| 14 | 13.816 | −3.816 | 5 | 8.816 | 1.439 | 44.01 |
| 15 | 13.816 | −3.816 | 5 | 8.816 | 1.439 | 44.01 |
| 16 | 5.816 | −5.816 | 0 | 5.816 | 1.316 | 49.458 |
| 17 | 7.816 | −5.816 | 1 | 6.816 | 1.358 | 47.446 |
| 18 | 9.816 | −5.816 | 2 | 7.816 | 1.399 | 45.645 |
| 19 | 11.816 | −5.816 | 3 | 8.816 | 1.439 | 44.01 |
| 20 | 13.816 | −5.816 | 4 | 9.816 | 1.48 | 42.50 |
| 21 | 13.816 | −5.816 | 4 | 9.816 | 1.48 | 42.50 |
| 22 | 7.816 | −7.816 | 0 | 7.816 | 1.399 | 45.645 |
| 23 | 9.816 | −7.816 | 1 | 8.816 | 1.439 | 44.01 |
| 24 | 11.816 | −7.816 | 2 | 9.816 | 1.48 | 42.507 |
| 25 | 13.816 | −7.816 | 3 | 10.816 | 1.52 | 41.124 |
| 26 | 13.816 | −7.816 | 3 | 10.816 | 1.52 | 41.124 |
| 27 | 9.816 | −9.816 | 0 | 9.816 | 1.48 | 42.507 |
| 28 | 11.816 | −9.816 | 1 | 10.816 | 1.52 | 41.124 |
| 29 | 13.816 | −9.816 | 2 | 11.816 | 1.561 | 39.834 |
| 30 | 13.816 | −9.816 | 2 | 11.816 | 1.561 | 39.834 |
| 31 | 11.816 | −11.816 | 0 | 11.816 | 1.561 | 39.834 |
| 32 | 13.816 | −11.816 | 1 | 12.816 | 1.602 | 38.626 |
| 33 | 13.816 | −11.816 | 1 | 12.816 | 1.602 | 38.626 |
| 34 | 13.816 | −13.816 | 0 | 13.816 | 1.641 | 37.552 |
| 35 | 13.816 | −13.816 | 0 | 13.816 | 1.641 | 37.552 |

$C_+$: $\theta + \mu\ [½(\theta_a + \theta_b) + ½(\mu_a + \mu_b)]$
$C_-$: $\theta - \mu\ [½(\theta_a + \theta_b) - ½(\mu_a + \mu_b)]$

We claim:

1. A supersonic plasma spray nozzle for use in the plasma spray deposition of a coating onto a target substrate, said spray nozzle comprising:

a nozzle body formed of a resilient heat resistant material and having a first end and a second end;

said body defining a central passageway having a longitudinal axis, said passageway extending through said nozzle body from said first end to said second end thereof;

means in said passageway for heating a flow of gas through the passageway to temperatures sufficient to ionize the gas flow and transform the gas flow into a heated plasma flow;

means in said passageway for injecting a material to be spray deposited, in powder form, into a plasma flow moving through said passageway;

said passageway having an upstream section adjacent said first end of said nozzle body, a throat section intermediate said first and second ends of said nozzle body, and a downstream section adjacent said second end of said nozzle body;

said upstream section of said passageway converging in cross sectional area from said first end of said nozzle body to said throat section and said downstream section of said passageway diverging in cross sectional area from said throat section to said second end of said nozzle body;

said diverging downstream section having a bell-shaped contour defined by continuously curving concave walls, said walls diverging outwardly from said throat section of said passageway and being substantially parallel to said longitudinal axis of said passageway at said second end of said nozzle body, whereby a plasma flow issuing from said nozzle is ideally and isentropically expanded as it moves through said bell-shaped downstream section of said passageway to exhibit reduced shock phenomena and consequent reduced overspray.

2. A supersonic plasma spray nozzle as claimed in claim 1 and wherein the bell-shape contour of said downstream section of said passageway is determined through application of the Method of Characteristics to insure efficient isentropic expansion of a plasma flow moving therethrough.

3. A supersonic plasma spray nozzle as claimed in claim 2 and wherein the bell-shape contour of said downstream section of said passageway is determined through application of a two-dimensional Method of Characteristics.

4. In the design of a supersonic plasma spray nozzle having a plasma passageway with a convergent upstream section, a throat section, and a divergent downstream section, a method of defining a bell-shaped contour of the divergent downstream section of the passageway such that plasma flow moving from the throat section of the passageway through the downstream section to the nozzle exit expands isentropically to produce a collimated plasma spray and is ideally expanded at the nozzle exit to reduce shock phenomena within the plasma spray, all for the purpose of decreasing overspray, said method comprising the steps of:

(a) determining the ambient pressure within which a plasma spray deposition procedure is to be accomplished;

(b) determining the characteristics of the gas to be passed through the nozzle for producing a heated plasma;

(c) calculating for the divergent downstream section of the passageway the ratio of nozzle exit area to throat area required to insure that the pressure within the plasma flow at the nozzle exit is substantially the same as the determined ambient pressure;

(d) calculating for the divergent downstream section of the passageway a bell-shaped contour defined by continuously curving concave walls that diverge from the throat section and that are substantially parallel to the longitudinal axis of the passageway at the nozzle exist so that a plasma flow moving through the downstream section of the passageway expands isentropically from the throat to the nozzle exit to create a plasma spray that is collimated and remains tightly packed from the nozzle to a target substrate; and (e) fabricating a plasma spray nozzle having the physical characteristics determined in steps (c) and (d).

5. The method of claim 4 and where in step (c) the ratio of exit area to throat area is determined through application of the equations $$\left(\frac{A_e}{A_t}\right)^2 = \frac{1}{M_e^2}\left[\frac{2}{\gamma+1}\left(1+\frac{\gamma-1}{2}M_e^2\right)\right]^{\frac{\gamma+1}{\gamma-1}}$$

and $$p_e = \frac{p_o}{\left(1+\frac{\gamma-1}{2}M_e^2\right)^{\frac{\gamma}{\gamma-1}}}$$

where $A_e$ is the exit area, $A_t$ is the throat area, $M_e$ is the design Mach number, $\gamma$ is the ratio of specific heats for the plasma gas, $P_o$ is the stagnation pressure, and $P_e$ is the static pressure of the plasma flow at the nozzle exit.

6. The method of claim 5 and wherein step (d) includes implementing a Method of Characteristics to determine uniquely the bell-shaped contour of the divergent downstream section of the passageway.

7. The method of claim 6 and wherein the Method of Characteristics is two-dimensional.

8. The method of claim 6 and wherein the Method of Characteristics is three-dimensional.

9. The method of claim 4 and wherein step (d) includes implementing a Method of Characteristics to determine uniquely the bell-shaped contour of the divergent downstream section of the passageway.

10. A Laval nozzle for use in supersonic plasma spray devices, said nozzle having a throat, a nozzle exit, and a divergent section extending from said throat to said nozzle exit, said divergent section having a bell-shaped contour defined by continuously curving concave walls that diverge from said throat and that are substantially parallel to each other at said nozzle exit, whereby a plasma flow is expanded isentropically as it traverses said divergent section to create a plasma spray with significantly reduced shock phenomena and overspray.

* * * * *